United States Patent
Dumont-Fillon et al.

[15] 3,665,085
[45] May 23, 1972

[54] ELECTRIC ARC FURNACE FOR CONTINUOUSLY MELTING SCRAP IRON

[72] Inventors: Jacques Dumont-Fillon; Charles Roederer, both of Metz (Moselle), France

[73] Assignee: Institut De Recherches De La Siderurgie Francaise, St. Germain en Laye, France

[22] Filed: July 25, 1969

[21] Appl. No.: 844,787

[30] Foreign Application Priority Data

July 31, 1968 France..................................161243

[52] U.S. Cl.............................................13/9, 13/34, 75/11
[51] Int. Cl. ..........................................H05b 7/18, C21c 5/52
[58] Field of Search..................75/11, 10; 13/9, 34; 266/27, 266/5 C; 263/27; 214/18.2

[56] References Cited

UNITED STATES PATENTS

| | | | |
|---|---|---|---|
| 3,249,423 | 5/1966 | Stewart | 75/11 |
| 3,472,650 | 10/1969 | Sibakin | 75/11 |
| 3,441,651 | 4/1969 | Viens | 13/9 |
| 2,011,288 | 8/1935 | Kemmer | 75/11 |
| 2,776,881 | 1/1957 | Thomsen | 75/11 |
| 2,978,315 | 4/1961 | Schenck | 75/11 |
| 3,167,420 | 1/1965 | Robiette | 75/11 |
| 3,372,223 | 3/1968 | Menegoz | 13/9 |
| 3,379,816 | 4/1968 | Hozven | 13/9 |
| 3,396,954 | 8/1968 | Kirogsrud | 13/9 |
| 3,461,214 | 8/1969 | Schlienger | 13/9 |
| 3,463,629 | 8/1969 | Hatch | 75/11 |

Primary Examiner—Winston A. Douglas
Assistant Examiner—Peter D. Rosenberg
Attorney—Michael S. Striker

[57] ABSTRACT

A method for continuously melting metallic products, especially scrap iron, in an electric arc furnace and a furnace for carrying out the method, in which the products to be molten are fed into the furnace hearth through a compartment which communicates at its lower end with a lower portion of the hearth and which is separated by a refractory wall from the upper hearth portion so that the products while being fed are protected from the heat produced by the electric arcs and fusion of the products during feeding thereof is prevented.

10 Claims, 6 Drawing Figures

Patented May 23, 1972  3,665,085

INVENTORS.
JACQUES DUMONT-FILLON
CHARLES ROEDERER

By Michael S. Striker
Attorney

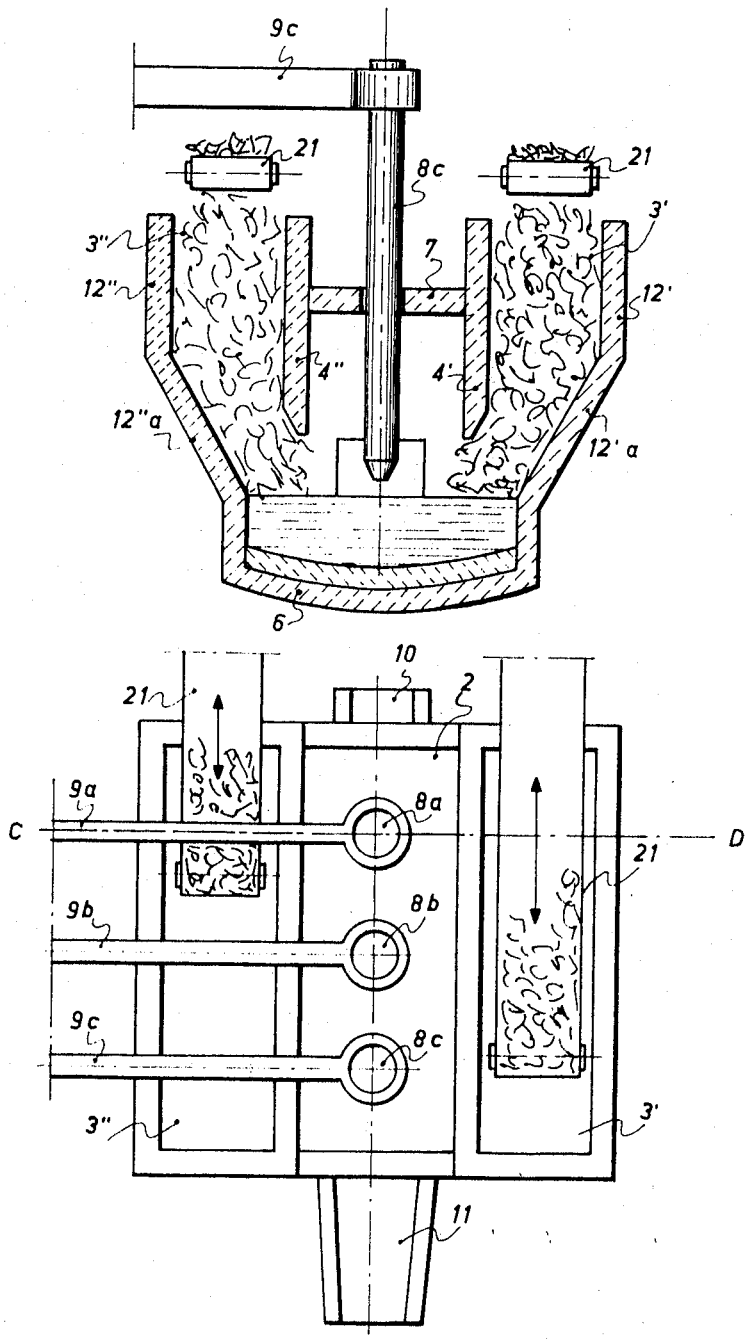

ELECTRIC ARC FURNACE FOR CONTINUOUSLY MELTING SCRAP IRON

BACKGROUND OF THE INVENTION

The present invention relates to a method for continuously melting scrap iron in an electric arc furnace as well as in a furnace for carrying out the method.

The melting of scrap iron in an electric arc furnace has so far always been carried out in a discontinued manner, since the charge for the furnace is supplied to the latter in successive portions, each of which can be introduced into the furnace only after the proceeding portion has been molten. The drawbacks of such process are well known in the art and they include the loss of time during the various charging operations, electric power fluctuations during collapse of the freshly-fed scrap iron at the melting thereof in the furnace, the danger of breaking the electrodes, a reduction of the thermal output, and increased wear of the lining of the furnace.

SUMMARY OF THE INVENTION

It is an object of the present invention to provide for a method and apparatus for continuously melting scrap iron to thus overcome the disadvantages of methods and apparatus known in the art.

In the apparatus according to the present invention, the products to be molten have to arrive continuously at the melting zone, without necessarily requiring a continuous charge of the material to be molten. The arrangement has to be made in such a manner that a progressive heating of the scrap iron during the feeding thereof into the hearth of the furnace is avoided, to thereby prevent softening of the material which would cause the srap iron pieces to stick together and thereby prevent, or at least render more difficult, further feeding thereof.

With these objects in view, the method according to the present invention for continuously melting metallic products, especially scrap iron, in an electric arc furnace, mainly comprises the steps of melting the products in the lower portion of the hearth of the furnace by electric arcs, feeding new products to be molten from above and laterally from the hearth into the lower portion of the latter so that the products form at the lower hearth portion a descending slope in contact with the molten material while protecting the products in the upper portion of the furnace from the heat developed by the electric arcs so as to prevent fusion of the products during the feeding thereof into the lower hearth portion, and discharging the molten material from the lower hearth portion of the furnace.

The method according to the present invention may also include in combination with the above-mentioned steps, the step of regulating the speed of melting of the metal by regulating the electric power furnished to the electrodes of the furnace.

It is also an object of the present invention to provide for an electric arc furnace for carrying out the above method and the furnace, according to the present invention, mainly comprises wall means forming a hearth of the furnace, electrode means extending downwardly into the furnace, and having lower ends above the bath of molten material forming at the lower portion of the hearth, means for feeding metallic products to be molten into the lower hearth portion and comprising at least one compartment adjacent the hearth, separated from the upper part of the hearth by a substantially vertical wall of refractory material and communicating at the lower end thereof with said hearth, and means communicating with the lower portion of the hearth for discharging molten products therefrom.

The furnace, according to the present invention, may also have the following characteristics in combination with the characteristics mentioned above:

a. the furnace may have a substantially circular cross section and the mentioned at least one compartment may be ring-shaped;

b. the furnace may have a rectangular cross section and comprise two compartments located at opposite sides of the longitudinal axis of the furnace hearth;

c. the mentioned refractory wall may be provided with means for circulating a cooling fluid therethrough; and d. the electrodes in the furnace of rectangular cross section may be aligned with each other in a plane, which preferably coincides with the longitudinal plane of symmetry of the rectangular furnace.

Basically, the present invention relates to a process and to an arrangement for carrying out the process in which the metallic products introduced into the electric arc furnace are protected during the feeding thereof from the heat radiated by the electric arcs and to melt these products in the lower zone of the furnace by means of the electric arcs. Metallic products thus introduced will remain at relatively low temperature until they are exposed to the heat developed by the electric arcs. To this effect a wall of refractory material separates the hearth of the furnace in which the electric arcs are produced, from a compartment into which the products to be molten are introduced. This wall extends from the top of the furnace to a distance which may vary between a few centimeters and about hundred centimeters above the maximum level of the liquid bath of molten material forming at the bottom of the hearth so that in a lower zone of the furnace the hearth and the compartment communicate with each other. In this zone, the metallic products introduced into the compartment are thus suddenly exposed to the heat developed by the arcs and melt rapidly. This rapid transition from a low-temperature zone to a zone of melting will prevent prolonged maintenance of the products to be fed in a region of elevated temperatures of between 900° and 1,200° C. in which a plastic deformation and resulting adherence to each other of the pieces to be fed would occur, which could cause hanging of the charge, detrimental to the proper charging of the furnace.

In addition, the maintenance of the scrap iron at relatively low temperature until it reaches the zone of fusion permits also to avoid oxidation of the same which is harmful to the metallurgical as well as to the thermal balance of the operation. Thus, increase in the productivity of the furnace is obtained.

Furthermore, the presence of ferrous products along the outer wall of the furnace at the level of the metallic bath forms a protective shield which will prevent rapid deterioration of the furnace lining at the portion thereof which is thus protected from the heat radiation produced by the arcs so that the useful life of the furnace is increased.

Finally, since a thermal equilibrium exists between the liquid phase and the mass of solid material to be molten which are in contact with each other, the melting speed of the material in the furnace will be determined by the electric power and not by the speed of charging the material into the furnace. Consequently, the manner of charging may be continuous or discontinuous according to the type of products to be molten.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a plan view of a third embodiment of the furnace according to the present invention;

FIG. 5 is a sectional view taken along the line C-D of the furnace shown in FIG. 4.

DESCRIPTION OF THE PREFERRED EMBODIMENTS

Figure 1:
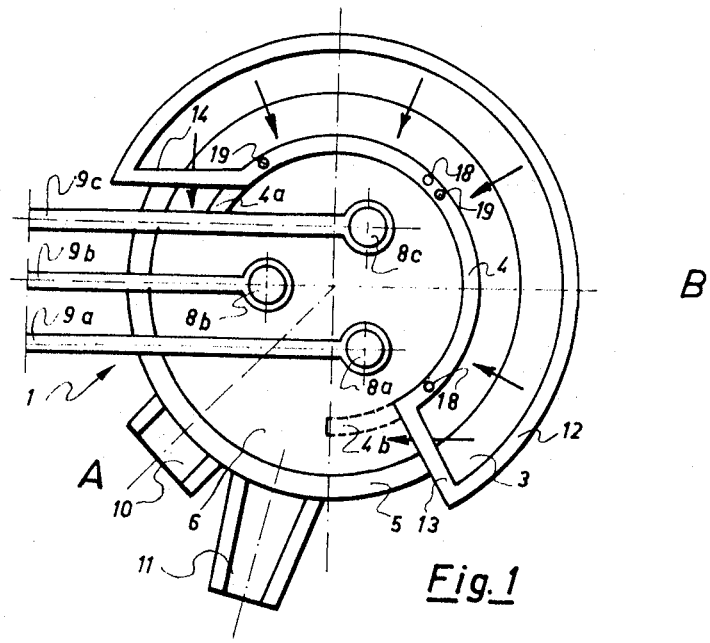
FIG. 1 is a plan view of a first furnace embodiment according to the present invention.
Figure 2:
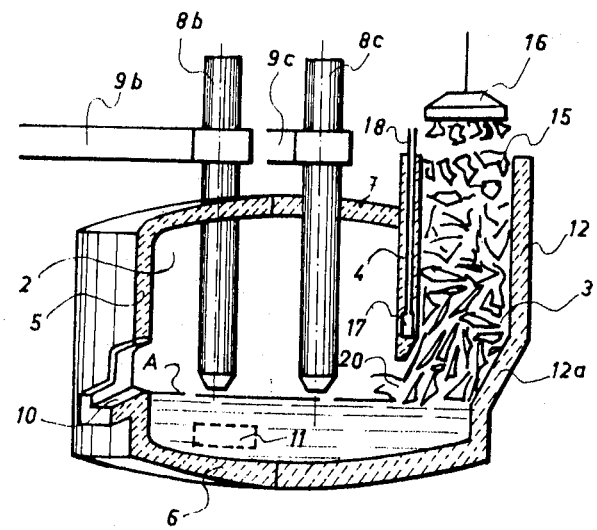
FIG. 2 is a cross section taken along the line A–B of the furnace shown in FIG. 1.

FIGS. 1 and 2 illustrate an electric arc furnace 1 of substantially circular cross section comprising a hearth 2 and a compartment 3 separated in the upper portion of the hearth 2 by a refractory wall or shield 4. The hearth 2 is formed by a cylindrical wall 5 of refractory material, a sole 6 and a vault or roof 7 likewise formed of refractory material. Three electrodes 8a,8b, and 8c extend through appropriate openings in the roof 7 in substantially vertical direction into the hearth and the electrodes are respectively supported on arms 9a,9b, and 9c which serve at the same time to supply the electrodes with electric current in a manner known in the art from transformers, not shown in the drawing. The hearth is further provided with a spout 10 for discharging the slag and with an opening 11 to discharge the molten metal from the lower hearth portion and such discharge from the opening 11 may be carried out by a siphon system of known construction.

The compartment 3 has thus a substantially annular form surrounding the hearth except for the zone in which the support arms are arranged and the zone through which discharge of the molten products takes place. It is also possible to arrange the spout 10 and the opening 11 in the zone in which the support arms are provided so that the compartment 3 may be extended and the surface of the wall 5 which is not protected be reduced. The compartment 3 is defined by an inner curved wall 4 which abuts against the roof and an outer curved wall 12 and two straight walls 13 and 14 which project only upwardly from the roof and which do not extend into the interior of the hearth 2. These walls thus form an annular hopper which projects upwardly essentially beyond the level of the roof 7 and which thus facilitates the charging operation. The wall 12 forms a broken outline with an oblique portion 12a in the zone which is not protected by the shield 4. The angle which the oblique portion 12a includes with a horizontal is shown about 60°. This slope has the advantage to facilitate sliding of the products which are still solid and their discharge into the molten metal. The furnace described is preferably used for melting scrap iron.

The charging of the scrap iron through the open end 15 of the compartment or hopper 3 is preferably made by means of an electromagnet 16, suspended and operated from a gantry crane, not illustrated, and which permits to place the scrap iron at any point at the annular space of the hopper 3 and to supply in this way each portion of this hopper. On the other hand, the scrap iron may be directly discharged from scrap iron stock contained in a railroad car or truck, for example, which constitutes another advantage of the furnace according to the present invention.

During its descend in the hopper 3, the scrap iron is protected from the heat radiation from the electric arcs by the wall 4 which, as mentioned above, is of refractory material and therefore a poor heat conductor. Nevertheless, during the operation of the furnace, the wall 4 is exposed to the heat radiation from the metallic bath at the bottom of the hearth and to a lesser degree also to the heat radiation from the electric arcs. To avoid deterioration of the wall 4 by excessive heating, the latter is provided with an interior cooling space 17 into which cooling water is fed through the conduits 18, and discharged through the conduits 19. It is to be understood that instead of cooling water also cold air or another cooling fluid may be circulated through the passages which are provided in the wall 4. Due to the protective shield 4, whether it is cooled or not, the scrap iron will arrive at the bottom of the compartment 3 at a relatively low temperature which will definitely be beneath the temperature at which the pieces of scrap iron soften and adhere to each other. Then, suddenly, the scrap iron will be exposed to the heat radiation of the electric arcs and melt at the bottom of the hearth. However, the melting scrap iron will be immediately replaced by new scrap iron in such a manner that at any instant there will exist a protective shield which covers the lower portion of the wall 12 and in particular the oblique portion 12a thereof. The wall 4 is constructed in such a manner to form a passage 20 between the hearth 2 and the compartment 3, a passage which permits formation of a slope of scrap iron moving downwardly towards the interior of the furnace in the direction indicated by the arrows. This passage has, in the example illustrated, a height of about 50 centimeters above the maximum level A of the bath of liquid metal at the bottom of the hearth and the form of a circular slot. The wall 4 is extended beneath the roof 7 by wall portions 4a,4b which serve to guide the downwardly moving slope of scrap beyond the extremities of the compartment 3. This has the advantage to form a protective shield of scrap iron along an important portion of the wall 5, and to avoid that the pile of scrap iron comes into contact with the electrodes. In this way, a short-circuit with the scrap iron is avoided and a liquid bath is maintained which assures proper stability of the electric arcs, which in this case will form exclusively between the electrodes and the liquid bath forming at the bottom of the hearth. At the same time, imparting of mechanical shocks to the electrodes by falling scrap iron is avoided and the risk of breaking the electrodes is thus greatly diminished.

Another advantage according to the present invention is that it is possible to constantly use the maximum power available while providing excellent conditions for heat transmission since most of the heat radiation is received by the products to be molten.

Another advantage which results from the above is that regulation of the power supply is greatly simplified, as compared with electric arc furnaces according to the prior art, so that the electric arc furnace according to the present invention is simpler in construction and more easily to maintain in proper condition than arc furnaces known in the art.

Since a solid phase of the material to be molten is constantly maintained in contact with the liquid phase, the temperature of the liquid phase is in the region of this contact, equal to the temperature of the liquidus and the total electric power used in this zone serves to melt the metal.

Another advantage of the present invention resides therefore in the possibility to precisely control the speed of melting of the scrap iron, and consequently the output of the furnace, since in this case the output is a function of the electric power supplied which may be precisely regulated.

In addition, the great flexibility of the means for charging the furnace according to the present invention permits to introduce into the furnace scrap iron pieces which differ essentially from each other as to dimensions and weight.

An additional advantage of the furnace according to the invention is that the openings for discharging the molten products from the lower hearth portion are arranged distant from the compartment 3, that is, from any scrap iron which is still solid. The temperature of the bath heated by the electric arc is therefore an elevated one in the region of these outlet openings, which greatly facilitates discharge of metal and slag.

During supply of electrodes from a three-phase network, the electrodes are, as known, not maintained exactly at the same tension, but one of the electrodes is charged to a higher degree than the other. This one electrode will evidently develop a more intense heat radiation than the others, and for this reason, the one electrode, that is for instance the electrode 8c, is placed, if possible, in such a manner that it is surrounded by the slope of scrap iron so that the surplus energy thus radiated from the electrode, is used for a maximum yield. The transmission of energy from the electrode 8c may be improved, for instance, by the use of an electromagnetic mixer and the action of such a mixer, which is not represented in the drawing, permits also to facilitate the outflow of the molten products and to prevent formation of a salamander, or a mass of solid material at the sole of the furnace.

Figure 3:
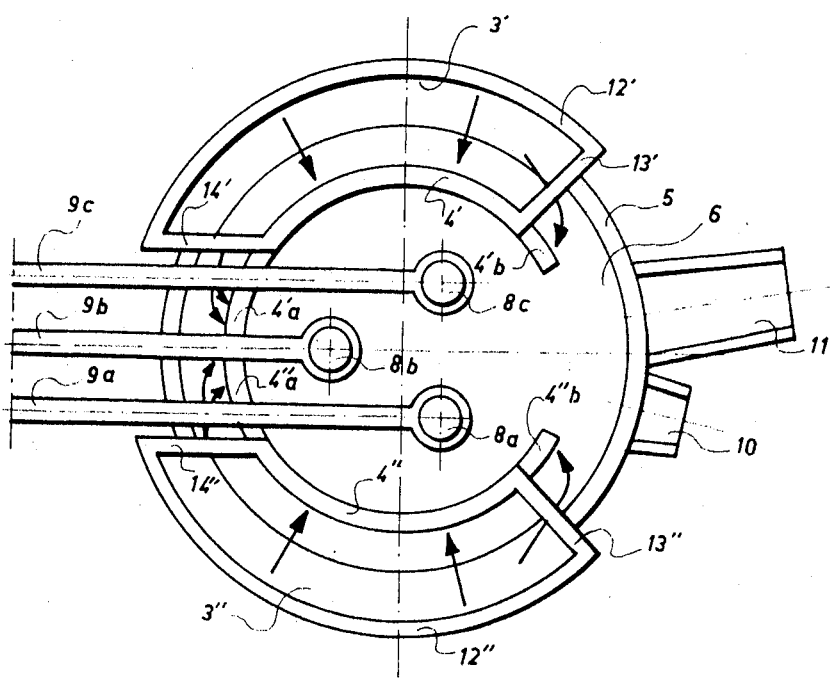
FIG. 3 is a plan view of a second embodiment of the furnace according to the present invention.

FIG. 3 illustrates a further embodiment of a furnace according to the present invention. The furnace illustrated in FIG. 3 is likewise a circular furnace which includes elements corresponding to the elements of the furnace illustrated in FIGS. 1 and 2 and described above and such common elements are designated in FIG. 3 with the same reference numerals to which however a "prime" is added. The furnace illustrated in FIG. 3 comprises two annular compartments or hoppers respectively designated with 3' and 3" and located outside of the zone in which the support arms 9a,9b, and 9c are provided and in which the means 10 and 11 for discharge of molten products from the furnace are located. The compartments 3' and 3" are respectively limited by the circular walls 4' and 12', respectively 4" and 12", and by the straight walls 13' and 14', respectively 13" and 14". The straight walls extend only upwardly from the roof 7 of the furnace and do not penetrate into the interior of the hearth 2 thereof. The arrows in FIG. 3 indicate the direction in which the slopes of material forming at the bottom of the compartments will move, and as can be seen from FIG. 3, such movement of the material will extend also beneath the support arms 9a,9b and 9c. In this zone of the supporting arms, the downwardly extending slopes of the material coming from the compartments 3' and 3" may join each other due to the wall portions 4'a and 4"a which, beneath the roof 7, extend the walls 4' and 4", whereas at the other extremity of the compartments 3' and 3", the wall portions 4'b and 4"b extend, beneath the roof 7, the walls 4' and 4" so that only the channel for the discharge of slag and steel is maintained free of solid scrap iron. This construction has the advantage to create a protective ring all around the wall of the furnace with the exception of the zone for discharge of the molten products. The molten products are discharged in the modification illustrated in FIG. 3 through the spouts 10 and 11 which are located side-by-side.

FIGS. 4 and 5 illustrate a third embodiment of the furnace according to the present invention, in which the furnace has a rectangular cross section. In the modification illustrated in these two Figures, there are provided two lateral compartments 3' and 3" of rectangular configuration located at opposite sides of the central hearth 2. An advantage of this arrangement is that the two lateral compartments may be supplied with material to be molten by transporting bands 21, one of which extends beneath at least one of the arms supporting and supplying current to the electrodes. The means 10 and 11 for discharging the molten products from the hearth are located at opposite ends of the hearth 2. In this modification, the sole 6 of the hearth is slightly inclined from the slag discharging spout 10 toward the opening 11 serving to discharge the molten steel, which facilitates discharge of the molten metal from the furnace. Furthermore, the electrodes 8a,8b, and 8c are aligned along a central longitudinal plane of symmetry of the furnace.

Figure 6:
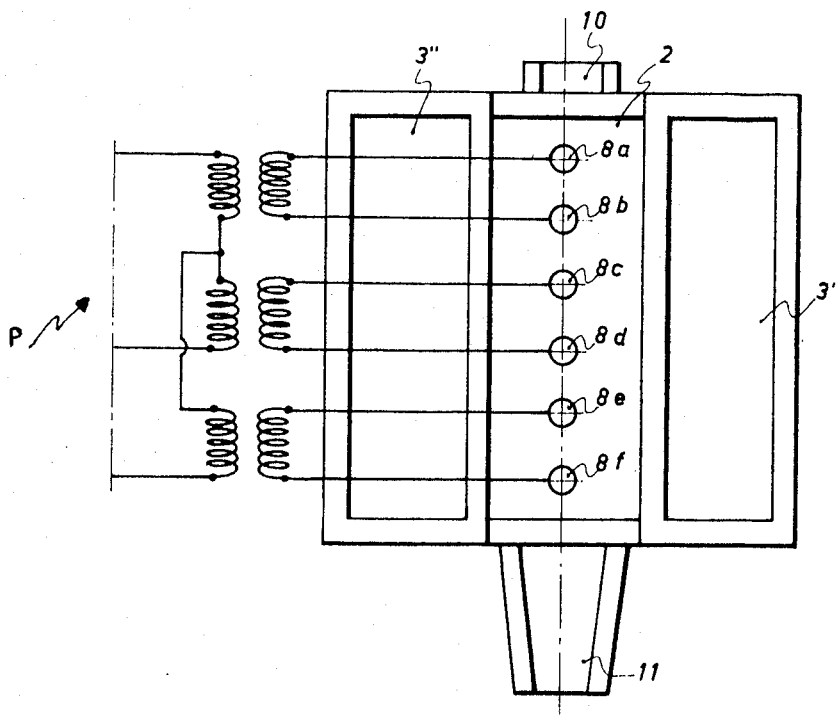
FIG. 6 is a schematic plan view of a further embodiment similar to that shown in FIG. 4.

Such a construction in which the hearth has a rectangular cross section, in which the electrodes are aligned along the longitudinal plane of symmetry of the hearth, and in which two downwardly moving slopes of material to be molten are provided, may also be used in furnaces differing from that shown in FIGS. 4 and 5, for instance in a furnace illustrated in FIG. 6 in which six electrodes, that is the electrodes 8a – 8f are aligned along the longitudinal plane of symmetry of the hearth 2. These electrodes are connected to the secondary windings of the transformer P, as schematically illustrated in FIG. 6.

While the charges for the furnace as described above have been described as scrap iron of any origin, it is to be understood that the invention is not limited in this respect, but that also other forms of metal for instance classified scrap iron or pre-reduced products in the form of pellets, sponge iron or briquettes, etc., may also be used.

Finally, the invention may be used for the discontinued production of molten metal with individual charges and rocking of the furnace after each operation, as well as for the uninterrupted production of steel by continuous melting of scrap iron in which the furnace constitutes the melting stage of a known process for treating metal. In the latter case, it is not necessary to provide for a rocking of the furnace.

It will be understood that each of the elements described above, or two or more together, may also find a useful application in other types of method and apparatus for melting metallic products.

While the invention has been illustrated and described as embodied in a method and apparatus for continuously melting of scrap iron, it is not intended to be limited to the details shown, since various modifications and structural changes may be made without departing in any way from the spirit of the present invention.

What is claimed as new and desired to be protected by Letters Patent is set forth in the appended claims.

I claim:

1. A furnace for continuously melting scrap metal products, comprising wall means forming a hearth of said furnace; electrode means extending downwardly into said furnace and having lower ends above the bath of molten material forming at the lower portion of the hearth; means for feeding scrap metal to be molten into the lower hearth portion and comprising at least one compartment adjacent a portion of the periphery of said hearth; a wall of refractory material located between said compartment and said hearth for shielding the scrap metal fed through said compartment from the heat radiated by said electrode means, said wall means having a lower end located slightly above the level of the bath in said hearth and at the region of the arcs formed between the lower ends of said electrode means and said bath so as to form between said compartment and said hearth a passage located in the region of said arcs for admission of scrap metal from said compartment in said hearth substantially at the level of the arcs, while the scrap metal descending through said compartment is protected from said arcs by said wall of refractory material.

2. A furnace as defined in claim 1, and including means for supplying electrical energy to said electrode means; and means communicating with said lower hearth portion for discharging molten products therefrom, said at least one compartment extending about a major portion of the periphery of said hearth spaced from said discharging means.

3. A furnace as defined in claim 2, wherein said at least one compartment has an end spaced from the means for supplying electrical energy to said electrode means.

4. A furnace as defined in claim 1, wherein said furnace has a substantially circular cross section and wherein said at least one compartment is substantially ring-shaped.

5. A furnace as defined in claim 1, wherein said furnace has a rectangular cross section and comprises two compartments located at opposite sides of the longitudinal axis of the furnace hearth.

6. A furnace as defined in claim 1, and including means for cooling said wall of refractory material and comprising conduit means embedded in said wall for circulating a cooling fluid therethrough.

7. A furnace as defined in claim 5, wherein said electrodes are aligned with each other in a plane.

8. A furnace as defined in claim 7, wherein said plane coincides with the longitudinal plane of symmetry of said rectangular furnace.

9. A furnace as defined in claim 4, and including means for supporting and for supplying electrical energy to the upper ends of said electrodes, said at least one compartment being located laterally from said supporting and supplying means.

10. A furnace as defined in claim 9, wherein said means for discharging molten material from said furnace are located substantially diametrically opposite said supporting and supplying means of said electrodes, and wherein said furnace includes two compartments located substantially opposite each other and respectively between said supporting and supplying means and said discharging means.

* * * * *